United States Patent
Goodwin, III

(10) Patent No.: US 8,360,207 B1
(45) Date of Patent: Jan. 29, 2013

(54) SECURITY METHOD FOR A SELF-SERVICE CHECKOUT SYSTEM WITH RFID CAPABILITY

(75) Inventor: John C. Goodwin, III, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 2411 days.

(21) Appl. No.: 10/656,779

(22) Filed: Sep. 5, 2003

(51) Int. Cl.
*A63F 9/02* (2006.01)

(52) U.S. Cl. .................................. 186/62; 340/572.1

(58) Field of Classification Search ............ 235/472.02, 235/375–385; 340/572.1; 705/16–29; 186/59–62
See application file for complete search history.

(56) References Cited

U.S. PATENT DOCUMENTS

| | | | |
|---|---|---|---|
| 4,816,824 A | 3/1989 | Katz et al. ............... 340/825.34 |
| 5,151,684 A | 9/1992 | Johnsen ....................... 340/572 |
| 5,239,167 A | 8/1993 | Kipp .............................. 235/383 |
| 5,729,697 A * | 3/1998 | Schkolnick et al. ............ 705/23 |
| 6,019,394 A | 2/2000 | Chenoweth et al. ............ 283/81 |
| 6,032,128 A * | 2/2000 | Morrison et al. ............... 705/23 |
| 6,378,684 B1 * | 4/2002 | Cox .............................. 194/213 |
| 6,672,506 B2 * | 1/2004 | Swartz et al. ................... 235/383 |
| 6,776,333 B2 * | 8/2004 | Matsushita ..................... 235/383 |
| 7,005,985 B1 * | 2/2006 | Steeves ....................... 340/572.1 |
| 7,044,370 B2 * | 5/2006 | Bellis et al. ..................... 235/383 |
| 2002/0079367 A1 * | 6/2002 | Montani ........................ 235/383 |
| 2003/0015585 A1 * | 1/2003 | Wike et al. ..................... 235/383 |
| 2003/0018897 A1 * | 1/2003 | Bellis et al. .................... 713/182 |

\* cited by examiner

*Primary Examiner* — Jeffrey Shapiro
(74) *Attorney, Agent, or Firm* — Paul W. Martin; Peter H. Priest

(57) ABSTRACT

A security method for a self-service checkout system with radio frequency identification (RFID) capability. The security method includes the steps of obtaining cart identification information from an RFID label attached to a cart by a security computer at a security station, obtaining first item identification information from a self-service computer transaction record using the cart identification information, obtaining second item identification information from a group of RFID labels attached to a group of items in the cart by the security computer, and comparing the first item identification information in the transaction record to the second item identification information to determine whether the second item identification information equals the first item identification information.

11 Claims, 4 Drawing Sheets

SECURITY METHOD FOR A SELF-SERVICE CHECKOUT SYSTEM WITH RFID CAPABILITY

BACKGROUND OF THE INVENTION

The present invention relates to self-service checkout systems in supermarkets and other retail establishments, and more specifically to a security method for a self-service checkout system with RFID capability.

Self-checkout systems typically include similar components as full-service checkout systems. One such self-service system is disclosed in U.S. Pat. No. 5,992,570 assigned to the assignee of the present invention. This patent is hereby incorporated by reference.

Self-checkout systems typically employ weight testing for security. Weight testing involves comparing the weight of a scanned item as determined in a look-up file against another weight reported by a security scale under a bag containing the item. Weight testing may also occur at the exit of a store.

Radio Frequency Identification (RFID) technology provides an alternative to bar code reader technology for distinguishing and recording items for purchase. Some of the uses of RFID technology are disclosed in U.S. Pat. No. 6,019,394 assigned to the assignee of the present invention. An example use of RFID technology in a self-checkout environment is disclosed in U.S. Pat. No. 6,547,040. These patents are hereby incorporated by reference.

It would be desirable to provide a security method for a self-service checkout system with RFID capability.

SUMMARY OF THE INVENTION

In accordance with the present invention, a security method for a self-service checkout system with radio frequency identification (RFID) capability is provided.

The security method includes the steps of obtaining cart identification information from an RFID label attached to a cart by a security computer at a security station, obtaining first item identification information from a self-service computer transaction record using the cart identification information, obtaining second item identification information from a group of RFID labels attached to a group of items in the cart by the security computer, and comparing the first item identification information in the transaction record to the second item identification information to determine whether the second item identification information equals the first item identification information.

It is accordingly an object of the present invention to provide a security method for a self-service checkout system with RFID capability.

It is another object of the present invention to provide a security method which compares RFID label information.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION

Figure 1:
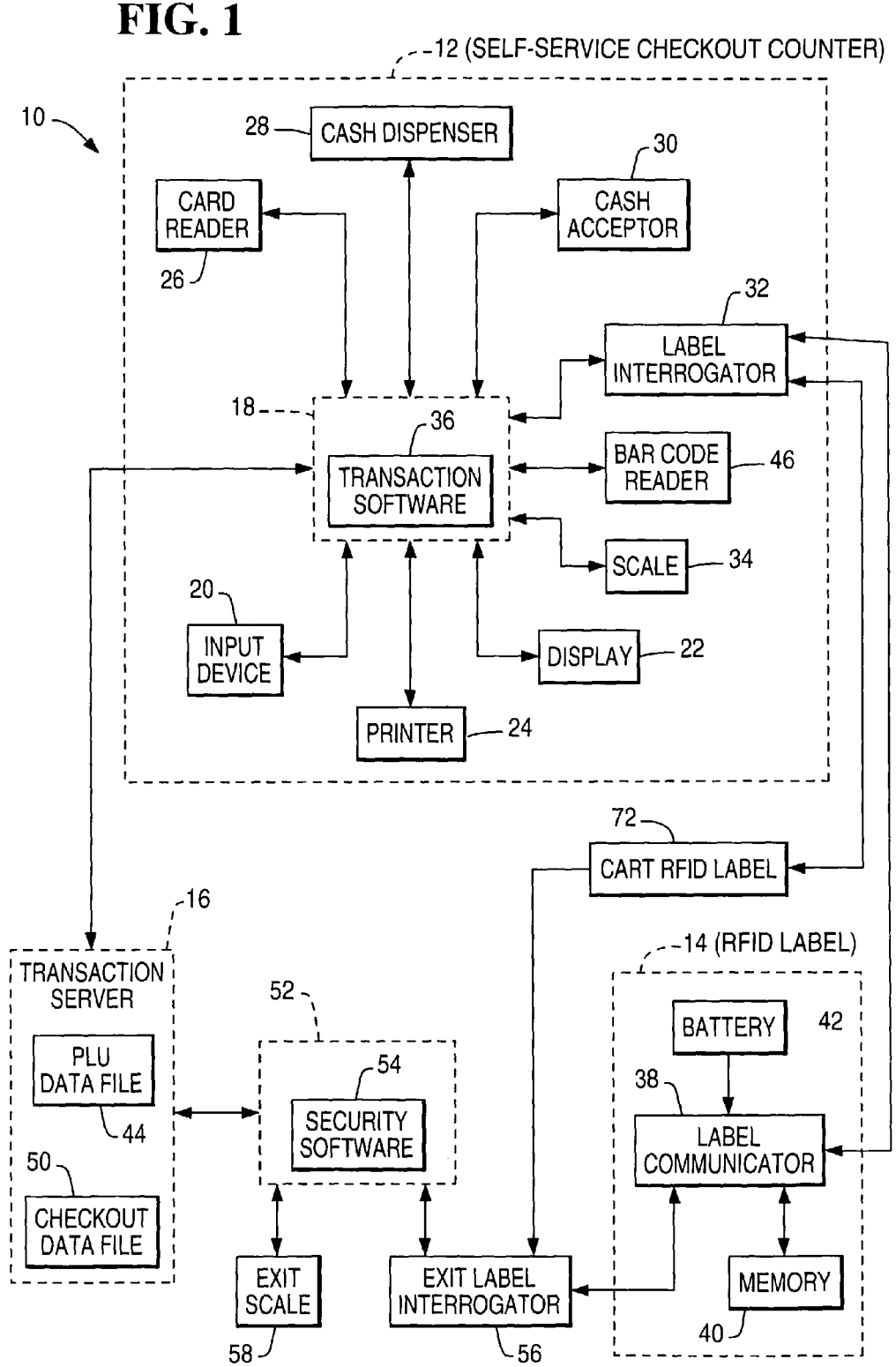
FIG. 1 is a block diagram of a transaction system with RFID capability.

Referring to FIG. 1, one embodiment of transaction system 10 includes self-service checkout counter 12, RFID label 14, transaction server 16, and security computer 52.

Self-service checkout counter 12 includes terminal 18, input device 20, display 22, printer 24, card reader 26, cash dispenser 28, cash acceptor 30, label interrogator 32, and scale 34.

Terminal 18 controls operation of self-service checkout counter 12 and executes transaction software 36.

Transaction software 36 obtains item identification information, determines prices, and processes payment.

Transaction software 36 also sends individual transaction records to transaction server 16 with corresponding cart identification information stored in cart RFID label 72.

Input device 20 records customer selections. Input device 20 may be a touch screen or keyboard.

Display 22 displays program instructions to assist the customer through a transaction. Display 22 may be a liquid crystal display and may be combined with input device 20 as a touch screen.

Printer 24 prints transaction information on receipt paper.

Card reader 26 reads information from customer payment and identification cards. Card reader 24 may include a magnetic stripe reader or smart card reader or combination of both.

Cash dispenser 28 provides change and extra cash.

Cash acceptor 30 accepts cash payments.

Label interrogator 32 interrogates RFID label 14 to determine a product identification number for a product associated with RFID label 14. Label interrogator 32 may include an RF transceiver. Label interrogator 32 may be located in several locations, depending upon the configuration of self-service checkout counter 12 and any corresponding security precautions.

RFID label 14 is an identification label. RFID label 14 may vary in size, depending upon product size, and may be visible or hidden when attached to a product. RFID label 14 may be removably or permanently attached to the product. RFID label 14 includes label communicator 38.

RFID label 14 may be an active or passive label. Active RFID labels may include RFID memory 40 and battery 42. Alternative power sources may be capacitive, inductive, or derive energy from radio waves. Label communicator 38 may include an RF transceiver.

Passive RFID labels use very little energy and may only include label communicator 38. Label communicator 38 may include a reflective antenna, such as a conductive ink antenna, which has a frequency which is unique among RFID labels.

If active, label communicator 38 sends item identification information stored in RFID memory 40 to label interrogator 32 in self-service checkout counter 12. If passive, label communicator 38 sends a unique signature which is compared to a table of item identifications to identify the associated product.

Memory 40 stores item identification information and may include a read-only memory (ROM).

Battery 42 provides power to label communicator 38.

Label interrogator 32 also interrogates cart RFID label 72 to determine a cart identification number. Cart RFID label 72 is similar to item RFID label 14.

Transaction server 16 receives item identification from terminal 18 and returns price and weight information from price look-up data file 44.

Transaction server 16 also stores individual transaction records in checkout data file 50. Transaction records are indexed by cart identification information stored in cart RFID label 72.

Scale 34 determines weight of all products on scale 34 for security purposes.

Self-service checkout counter 12 may additionally include a barcode reader 46 to the extent that some items contain barcode labels instead of RFID labels 14.

Security computer 52 is operated by a security attendant. Security computer 52 executes security software 54 which compares items in cart 70 (FIG. 2) with items listed in the corresponding record of checkout data file. Security software 54 obtains identification information from RFID label 14 and cart RFID label 72 through exit label interrogator 56.

Security software 54 may also obtain a cart weight through exit scale 58 and compare the cart weight to the sum of purchased item weights determined from PLU data file 44, self-service checkout system 12, or both.

Figure 2:
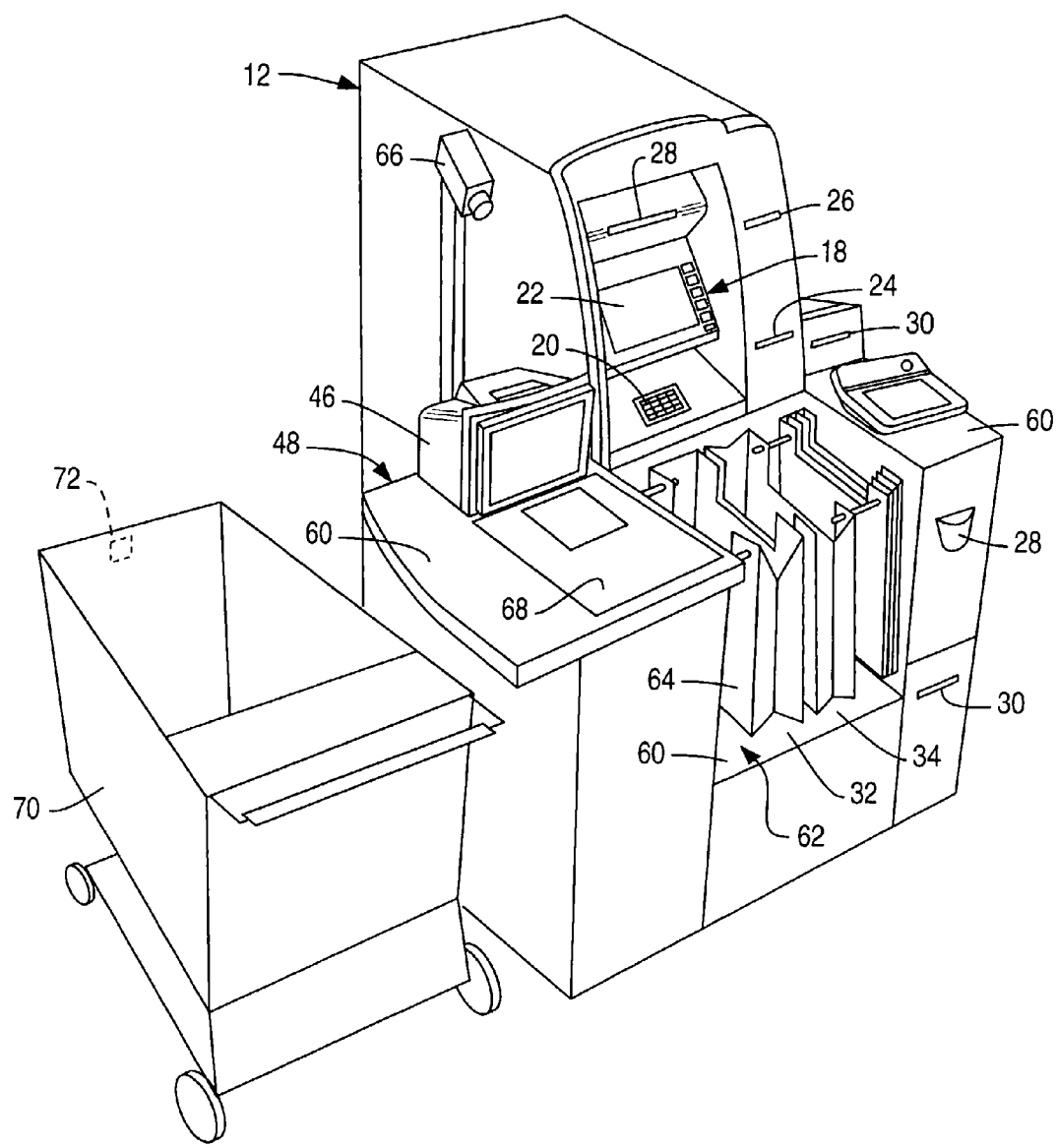
FIG. 2 is a perspective view of one example implementation of a self-service checkout system with RFID capability.

Turning now to FIG. 2, an example embodiment of self-checkout counter 12 is illustrated in detail.

Self-checkout counter 12 additionally includes counter 48, camera 66, and produce scale 68. Counter 48 includes working surfaces 60, which provide space for arranging or bagging purchased items from cart 70. As such, working surfaces 60 include bag well 62.

Label interrogator 36 is preferably located near any working surface 60. In this embodiment, label interrogator 36 is shown in bag well 62. Also, one or more scales 34 are envisioned and they may be located under any of working surfaces 60 to monitor for product substitutions.

Camera 66 monitors customers during checkout. A store employee may monitor several self-service checkout counters 12 from a security desk.

Produce scale 68 provides weight information for produce items, if purchased.

Figure 3A:
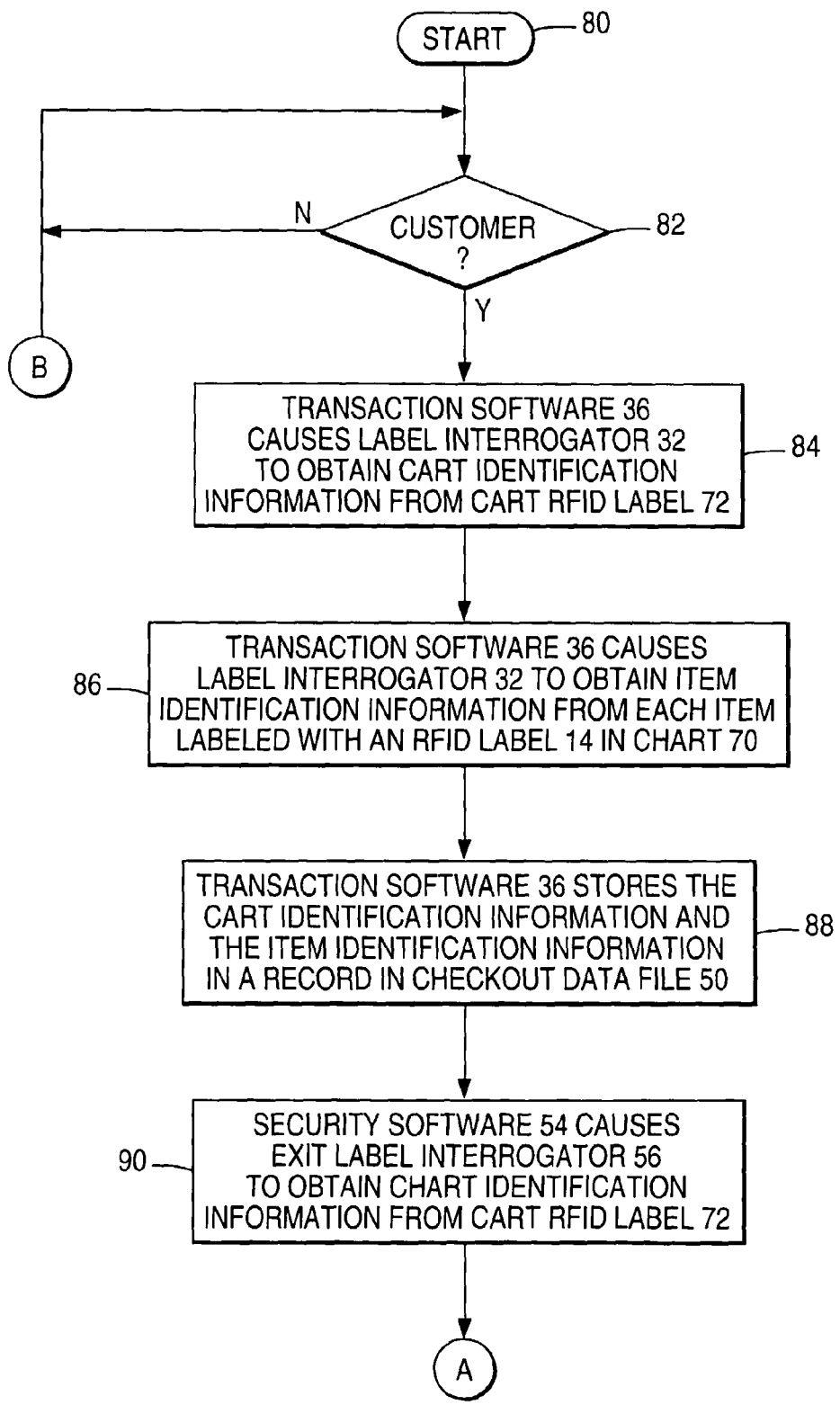
FIGS. 3A and 3B form a flow diagram illustrating the security method.
Figure 3B:
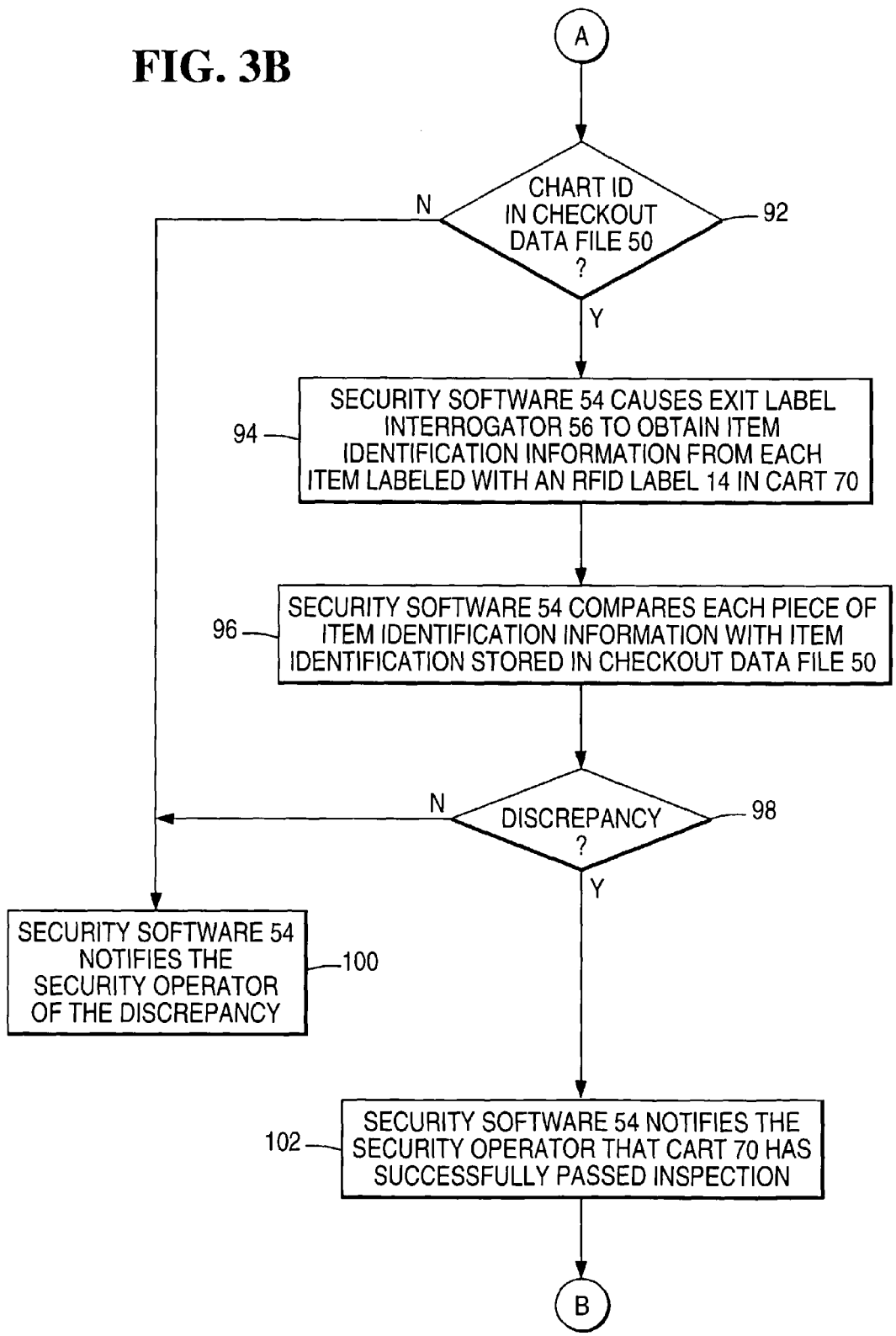

Referring now to FIGS. 3A and 3B, a security method is illustrated in detail beginning with START 80.

In step 82, transaction software 36 waits for a customer.

In step 84, transaction software 36 causes label interrogator 32 to obtain cart identification information from cart RFID label 72.

In step 86, transaction software 36 causes label interrogator 32 to obtain item identification information from each item labelled with an RFID label 14 in cart 70.

In step 88, transaction software 36 stores the cart identification information and the item identification information in a record in checkout data file 50.

In step 90, security software 54 causes exit label interrogator 56 to obtain cart identification information from cart RFID label 72.

In step 92, security software 54 reads checkout data file 50 to determine whether the cart identification information is stored therein. If so, operation proceeds to step 94. Otherwise, operation proceeds to step 100. In step 94, security software 54 causes exit label interrogator 56 to obtain item identification information from each item labelled with an RFID label 14 in cart 70.

In step 96, security software 54 compares each piece of item identification information with item identification stored in checkout data file 50.

In step 98, security software 54 determines whether there is a discrepancy from the comparison. Specifically, security software 54 determines whether an item in cart 70 with an RFID label 14 is not in checkout data file 50. This would imply that the item was not paid for at self-service checkout counter 12. If so, operation proceeds to step 100. Otherwise, operation proceeds to step 102.

In step 100, security software 54 notifies the security operator of the discrepancy. Security software 54 may display the status of the comparison. The security operator may cause exit label interrogator 56 to reread all of the RFID labels 14. The security operator may also do a visual comparison of the items to a list of purchased items.

In step 102, security software 54 optionally notifies the security operator that cart 70 has successfully passed inspection. Security software 54 may display the status of the comparison by displaying swapped or added items. Alternatively, security software 54 may provide no notification if there are no discrepancies.

Operation returns to step 82 to await the next customer.

Security software 54 may also do a weight check by having exit scale 58 weigh cart 72 and its contents and comparing the weight to a calculated weight.

Although the present invention has been described with particular reference to certain preferred embodiments thereof, variations and modifications of the present invention can be effected within the spirit and scope of the following claims.

What is claimed is:

1. A security method comprising the steps of:
   a) obtaining cart identification information from a radio frequency identification label attached to a cart, obtaining of cart information being performed by a security computer at a security station;
   b) obtaining a first set of item identification information from a self-service computer transaction record using the cart identification information as an index to the transaction record;
   c) obtaining a second set of item identification information from a group of radio frequency identification labels attached to members of a second group of items in the cart, each of one or more members of the group bearing its own radio frequency identification label, the radio frequency identification label attached to an item providing information identifying that item, obtaining of the second set of item identification information being performed by the security computer; and
   d) comparing the first set of item identification information in the transaction record to the second set of item identification information to determine whether the second set of item identification information equals the first set of item identification information.

2. The method of claim 1, further comprising the step of:
   e) notifying a security operator if the second set of item identification information fails to equal the first set of item identification information.

3. The method of claim 1, further comprising the step of:
   e) displaying additional items present in the second group of items but not in the first group of items if the second set of item identification information fails to equal the first set of item identification information.

4. The method of claim 1, further comprising the step of:
   e) repeating steps a) through d) if the second set of item identification information fails to equal the first set of item identification information.

5. The method of claim 1, further comprising the steps of:
   e) obtaining first weight information from the transaction record using the cart identification information as an index to look up the transaction record, the step of obtaining the first weight information including examining the transaction record for weight information stored during the transaction;

f) obtaining second weight information for the group of items in the cart by using the security computer; and g) comparing the second weight information to the first weight information to determine whether the second weight information equals the first weight information.

6. A security method comprising the steps of:

a) obtaining cart identification information from a radio frequency identification label attached to a cart using a self-service checkout computer;

b) obtaining a first set of item identification information from a first group of radio frequency identification labels attached to members of a first group of items in the cart, obtaining of the first set of item identification information being performed by the self-service checkout computer;

c) storing the cart identification information and the first set of item identification information in a transaction record using the self-service checkout computer;

d) obtaining the cart identification information from the radio frequency identification label attached to the cart obtaining of the cart information being performed by a security computer at a security station;

e) obtaining the first set of item identification information from the transaction record using the cart identification information;

f) obtaining second item identification information from a second group of radio frequency identification labels attached to a second group of items in the cart obtaining of the second set of item identification information being performed by the security computer; and g) comparing the first item identification information in the transaction record to the second item identification information to determine whether the second item identification information equals the first item identification information.

7. The method of claim 6, further comprising the steps of:

h) obtaining a first set of weight information for the first group of items in the cart from a weight file, obtaining of the first set of weight information being performed by the self-service checkout computer;

i) totalling the first weight information using the self-service checkout computer;

j) storing a first total weight in the transaction record using the self-service checkout computer;

k) obtaining the first weight information with the first item identification information from the transaction record using the cart identification information;

l) obtaining a second set of weight information for the second group of items in the cart, obtaining of the second set of weight information being performed by the security computer; and m) comparing the second set of weight information to the first set of weight information to determine whether the second item identification information equals the first item identification information.

8. A security system comprising:

a radio frequency identification label reader at a security station; and a security computer at a security station for obtaining cart identification information from a radio frequency identification label attached to a cart, for obtaining a first set of item identification information from a self-service computer transaction record using the cart identification information, for obtaining a second set of item identification information from a group of radio frequency identification labels attached to a group of items in the cart, and for comparing the first set of item identification information in the transaction record to the second set of item identification information to determine whether the second item identification information equals the first item identification information.

9. The system of claim 8, wherein the security computer also notifies a security operator if the second set of item identification information fails to equal the first set of item identification information.

10. The system of claim 8, wherein the security computer also displays items reflected in the second set of item identification information but not reflected in the first set of item identification information.

11. The system of claim 8, further comprising a security scale, wherein the security computer also obtains a first weight information from the self-service computer transaction record using the cart identification information, obtains second weight information for the group of items in the cart using the security scale, and compares the second weight information to the first weight information to determine whether the second item identification information equals the first item identification information.

* * * * *